UNITED STATES PATENT OFFICE.

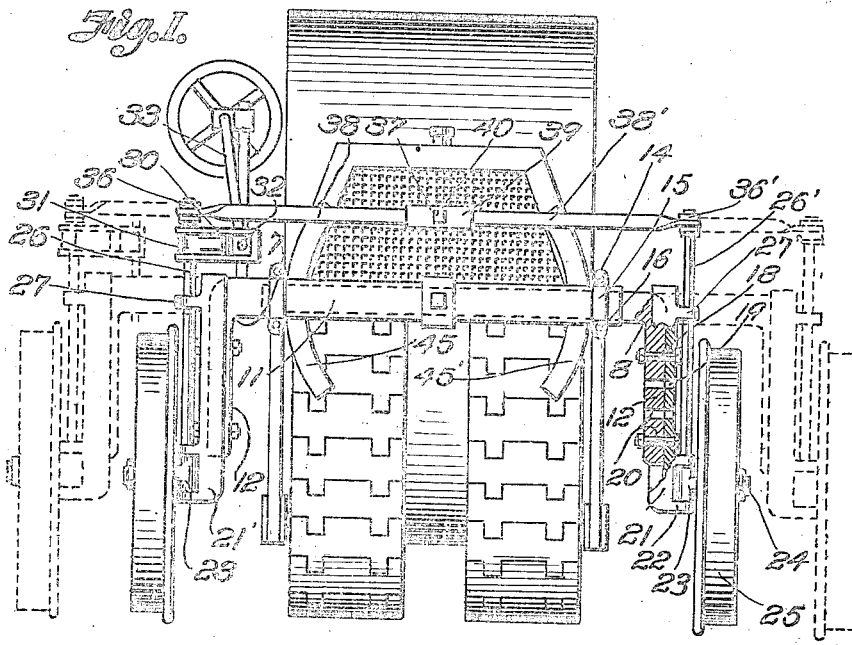

ANDREW H. REED, OF KANSAS CITY, MISSOURI.

ADJUSTABLE AXLE FOR TRACTORS.

1,301,971.　　　　Specification of Letters Patent.　　Patented Apr. 29, 1919.

Application filed March 15, 1918.　Serial No. 222,697.

*To all whom it may concern:*

Be it known that I, ANDREW H. REED, a citizen of the United States, residing at Kansas City, in the county of Jackson and State of Missouri, have invented certain new and useful Improvements in Adjustable Axles for Tractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to farm tractors and more particularly to tractors used for the cultivation of plants growing in rows planted at definite spaced intervals; the principal object of the present invention being to provide an adjustable axle for mounting the tractor guide wheels, comprising telescoping sections that may be adjusted to retain the wheels at a certain spaced distance as is determined by the spacing of three rows of plants in which the tractor is being operated so that the plants may be properly cultivated without damage being done thereto by said wheels.

It is a further object of the invention to provide improved details of structure whereby the telescoping parts may be made of substantial strength with as little weight as possible and whereby the parts may be joined together and fixed to the tractor frame to form a pivotal support for the latter.

In accomplishing these objects I have provided improved details of structure the preferred forms of which are illustrated in the accompanying drawings, wherein:

Figure I is a front end view of a tractor equipped with an axle constructed according to the present invention.

Fig. II is a plan view of the forward end of the tractor showing the same parts.

Fig. III is a detail perspective view of parts of the frame and axle illustrating the pivotal mounting of the axle, and the steering mechanism.

Fig. IV is a sectional detail.

Referring more in detail to the drawings:—

1 and 2 designate opposite side beams forming a part of a tractor frame wherewith the present axle is used; the said side beams being connected at their forward ends by a transverse beam 3 provided at its center with a bearing block 4 that is bolted or otherwise substantially fixed thereto wherein a forwardly extending pivot pin 5 is mounted, the latter being adapted to pivotally support the forward end of the tractor frame from the axle presently described.

The axle, in its preferred construction, comprises a back bar 6 and inner and outer telescoping axle sections 7 and 8 which are mounted thereon; the said bar member having a length approximately equal to the width of the frame and is pivoted at its center point on the forward end of the pin 5, and along its outer face is provided with a longitudinally extending rib or rail 9 which serves as a guide whereon the inner telescoping axle member may move and which serves to retain the bar and axle members in rigid relation.

The axle sections 7—8 respectively comprise channel like horizontal portions 10 and 11, provided at their outer ends with down turned vertical legs 12—12'; the inner channel portion 10 being adapted to snugly receive the rib 9 on the back bar 6 and to slide thereon to effect a lateral adjustment of the leg 12 carried thereby toward or from the frame. The outer channel member is of such size that it will slidably contain the inner channel member and may be adjusted thereon similarly as the member 10 is adjusted on the rib 9 so that the leg 12' carried thereby may be adjusted at the opposite side of the frame similarly as the leg 12.

In order to retain the telescoping members in functional position while being adjusted and to hold the same rigidly together after the desired adjustment has been made, I provide clamp members that are adapted to inclose the said members and opposite ends of the back bar; the said clamp members comprising U-bolts 14 and apertured plates 15 adapted to receive the ends of the said bolts so that by the use of nuts 16 threaded onto the bolt ends the parts may be clamped tightly about the telescoped sections and back member to fasten all of the parts substantially together at the adjusted position. It is apparent that if it is desired to re-adjust the parts the bolts may be loosened by turning the nuts 16 and the axle members may then be moved inwardly or outwardly as desired and the bolts again tightened to hold the parts as set.

Adjustably fixed to the opposite legs 12—12' of the axle members by means of bolts 18, extended through apertures 19 therein and through registering apertures 20 in the said legs, are wheel carrying members 21—21'; the latter being provided at their lower ends with out turned yoke portions 22 wherein knuckle members 23 are mounted; the knuckle having hubs 24 extending therefrom whereon the ground or steering wheels 25 are revolubly fixed.

The knuckle members are revolubly mounted within the yoke members on the lower ends of vertical rods 26—26' which extend slightly above the level of the axle and adjacent their upper ends are revolubly contained in bearings 27—27' formed at the upper ends of the wheel carrying members. The rods 26—26' are fixed at their lower ends within the knuckles so that the direction of the wheels is controlled by the turning of said rods.

Supported from the axle in a fixed position relative to the rod 26 by means of a vertically adjustable post 29 extending through the axle member 10, is a housing 30, wherein a gear sector 31, that is fixed to the upper end of the rod 26, is adapted to operate, and revolubly supported within the said housing is a worm shaft 32 that operates in mesh with the said sector and whereto a steering rod 33 is fixed by a universal coupling 34 so that a driver at the rear of the tractor may, by turning the rod 33 effect movement of the sector 31 and thereby actuate the guide wheels in a desired direction.

In order that both wheels may be operated synchronously I fix lever arms 36—36' at the upper ends of the rods 26—26' which are connected by a cross bar 37 comprising overlapped sections 38—38'; the overlapped ends of which extend through a collar 39 and are clamped together in proper alinement by threading a set screw 40 through the collar wall to bear against the adjacent bar and hold the overlapped ends tightly together. This adjustment is provided in order that proper steering adjustment may be made in accordance with the lateral adjustment of the wheel carrying parts of the axle sections.

In order to prevent any possible displacement of the axle, should an unusual strain be placed thereon when it occupies an inclined position relative to the frame, I have fixed segmental guide arms 45—45' to the front beams 3 of the frame against which the axle may bear when so inclined and the pivot pin will thereby be relieved of any undue bending tendency.

With the axle parts so constructed and assembled, it is apparent that lateral adjustment of the wheels may be made by loosening the clamp members and moving the channeled sections inwardly or outwardly on the back member and when properly adjusted may be held at the adjusted position by tightening the clamp members thereagainst.

It is further apparent that vertical adjustment of the wheels may be made by movement of the wheel carrying member along the legs 12.

With such lateral adjustment, it is apparent that by a proper setting of the wheels the tractor may be operated successfully between rows of plants spaced at various distances without damage thereto.

Having thus described my invention, what I claim as new therein, and desire to secure by Letters Patent, is:—

1. In a tractor, a frame having a transverse end member, an axle comprising a bar centrally pivoted to and of substantially the same length as the frame member, and having a longitudinally extending rib thereon, inner and outer laterally adjustable wheel carrying sections mounted on said bar; the inner section being adapted to slidably receive said bar rib and the outer section being telescopically mounted on the inner section, and clamp devices inclosing both of said sections and said bar at its opposite ends to lock the said sections at any laterally adjusted position.

2. In a tractor, a frame having a transverse end member, an axle comprising a back bar centrally pivoted to the frame member and having a longitudinally extending rib thereon, inner and outer laterally adjustable sections mounted on said bar and having downturned end portions at opposite sides of the frame; said inner adjustable section comprising a channel like portion adapted to slidably receive said bar rib and said outer section comprising a channel like portion adapted to slidably contain the inner section, clamp devices inclosing both of said sections and said bar to lock the said sections at a laterally adjusted position and ground wheels steerably mounted on the downturned end portions of said axle sections.

3. In a tractor, a frame having a transverse end beam, a pivot pin extending centrally therefrom, an axle comprising a back bar centrally mounted on said pin and adapted to pivot therein in a vertical plane, and having a longitudinally extending rib on its forward face, inner and outer laterally adjustable sections mounted on said bar and comprising downturned end portions at opposite sides of the frame; said inner adjustable section comprising a channeled portion slidably mounted on said bar and inclosing said rib and said outer section comprising a channeled member slidably mounted on said inner section, clamp members inclosing said section and back bar to lock the sections at adjusted positions, wheel carrying members mounted on said laterally adjustable sections and guide wheels steerably mounted on said members.

In testimony whereof I affix my signature.

ANDREW H. REED.